United States Patent
Ree et al.

(10) Patent No.: US 6,713,593 B2
(45) Date of Patent: Mar. 30, 2004

(54) COPOLYMER COMPRISING ALKYLENE CARBONATE AND METHOD OF PREPARING SAME

(75) Inventors: Moon-Hor Ree, Pohang (KR); Yong-Taek Hwang, Pohang (KR); Seung-Jae Moon, Pohang (KR); Myung-Hwan Kim, Pohang (KR)

(73) Assignee: Pohang Iron & Steel Co., Ltd., Pohang (KR)

( * ) Notice: Subject to any disclaimer, the term of this patent is extended or adjusted under 35 U.S.C. 154(b) by 0 days.

(21) Appl. No.: 10/149,541

(22) PCT Filed: Oct. 11, 2001

(86) PCT No.: PCT/KR01/01715
§ 371 (c)(1),
(2), (4) Date: May 14, 2002

(87) PCT Pub. No.: WO02/31023
PCT Pub. Date: Apr. 18, 2002

(65) Prior Publication Data
US 2003/0013840 A1 Jan. 16, 2003

(30) Foreign Application Priority Data

Oct. 11, 2000 (KR) .......................................... 2000-59671
Oct. 11, 2000 (KR) .......................................... 2000-59672

(51) Int. Cl.$^7$ .............................................. C08G 64/00
(52) U.S. Cl. ...................... 528/196; 264/219; 264/340; 502/150; 528/198
(58) Field of Search .............................. 264/219, 340; 502/150; 528/196, 198

(56) References Cited

U.S. PATENT DOCUMENTS

| 4,891,263 A | 1/1990 | Kotliar et al. |
| 5,120,802 A | 6/1992 | Mares et al. |
| 6,083,524 A | * 7/2000 | Sawhney et al. ............ 424/426 |

FOREIGN PATENT DOCUMENTS

| EP | 0709420 | 5/1996 |
| JP | A1135655 | 2/1999 |
| WO | 9910404 | 3/1999 |

* cited by examiner

*Primary Examiner*—Terressa Boykin
(74) *Attorney, Agent, or Firm*—Baker Botts L.L.P.

(57) ABSTRACT

Disclosed are copolymers including an alkylene carbonate, and a method of preparing the same. The copolymers are represented by Formulas 1 and 2, and they are prepared with terpolymerized lactide or delta-valerolactone, carbon dioxide, and alkylene oxide, in the presence of a catalyst.

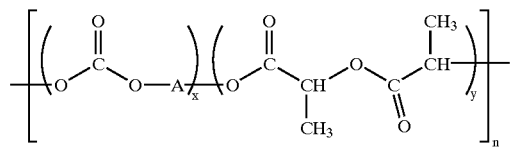

<Formula 1>

<Formula 2>

(wherein, —O—A— is an opened alkylene oxide structure, the alkylene oxide being selected from the group consisting of ethylene oxide, propylene oxide, 1-butene oxide, 1,1-dimethylethylene oxide, cyclopentene oxide, cyclohexene oxide, 1-phenylethylene oxide, 1-vinylethylene oxide, and 1-trifluoromethylethylene oxide; and x and y are independently an integer being equal to or less than 2,000, n is an integer, and n=(z-x-y), wherein z is an integer being equal to or less than 20,000.).

15 Claims, No Drawings

COPOLYMER COMPRISING ALKYLENE CARBONATE AND METHOD OF PREPARING SAME

BACKGROUND OF THE INVENTION (a) Field of the Invention

The present invention relates to a copolymer including an alkylene carbonate and a method of preparing the same, and specifically, to a copolymer including an alkylene carbonate using carbon dioxide and a method of preparing a copolymer including the alkylene carbonate that has excellent biodegradable properties.

(b) Description of the Related Arts

The development of industries in countries all over the world and the increase in population have increasingly destroyed the natural environment, and as industries in all fields develop, consumption of fossil fuels has increased drastically, causing a big increase in the amount of emitted air pollutants. In particular, among these air pollutants, gases causing the greenhouse effect have increased drastically, causing a big problem in climate changes all over the world. Carbon dioxide has received attention as a major cause of the greenhouse effect. Recently, proposals restricting the emission of carbon dioxide throughout the world have been sought, at the center of which lies the U.N. Framework Convention on Climate Change. A new solution for reducing the emission of carbon dioxide is to utilize it as a raw material for producing polymer materials. This can contribute greatly to humanity and the protection of the earth's environment.

Furthermore, polymer materials including plastics have contributed greatly to convenience in our day-to-day lives and the development of various modern industries, but the polymer materials have caused environmental pollution as their use increases day by day followed by a corresponding increase in the waste polymer materials after their use. Therefore, increasing attention has been given to polymer materials that can be hydrolyzed or biodegraded by microorganisms to protect the natural environment.

SUMMARY OF THE INVENTION

An object of the present invention is to provide a method of preparing a copolymer including an alkylene carbonate using carbon dioxide, which is an air pollutant source.

Another object of the present invention is to provide a copolymer including an alkylene carbonate that has excellent biodegradable properties.

In order to achieve the above objects, the present invention provides a method of preparing a copolymer including an alkylene carbonate, including terpolymerization of delta-valerolactone or lactide represented by Formula 3, carbon dioxide, and alkylene oxide, in the presence of a catalyst. In the above method, when lactide is used, poly(alkylene carbonate lactide) of Formula 1 is prepared, and alternatively, when delta-valerolactone is used, poly(alkylene carbonate-delta-valerolactone) is prepared.

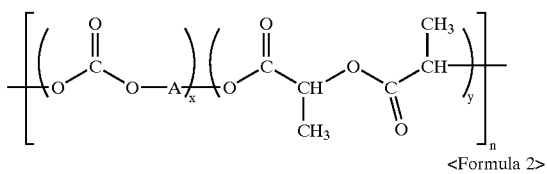
<Formula 1>

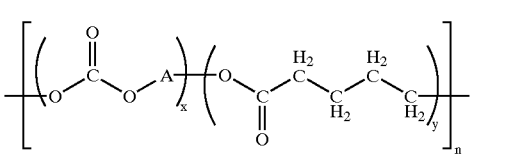
<Formula 2>

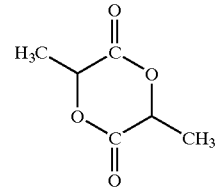
<Formula 3>

(wherein, —O—A— is an opened alkylene oxide structure, the alkylene oxide being selected from the group consisting of ethylene oxide, propylene oxide, 1-butene oxide, 2-butene oxide, 1,1-dimethylethylene oxide, cyclopentene oxide, cyclohexene oxide, 1-phenylethylene oxide, 1-vinylethylene oxide, and 1-trifluoromethylethylene oxide; and, x and y are independently an integer being equal to or less than 2,000, n is an integer, and n=(z-x-y), wherein z is an integer being equal to or less than 20,000.)

Alternatively, the present invention provides a poly(alkylene carbonate-lactide) copolymer represented by Formula 1, or a poly(alkylene carbonate-delta-valerolactone) copolymer represented by Formula 2.

DETAILED DESCRIPTION OF THE INVENTION

The present invention relates to a method of preparing a copolymer including an alkylene carbonate that has excellent biodegradable properties using carbon dioxide which is a main component of greenhouse gases that cause the greenhouse effect. The copolymer of the present invention is preferably a poly(alkylene carbonate-lactide) or a poly(alkylene carbonate-delta-valerolactone).

The method of preparation of the present invention includes terpolymerization of delta-valerolactone or lactide represented by Formula 3, alkylene dioxide, and carbon dioxide, in the presence of a catalyst.

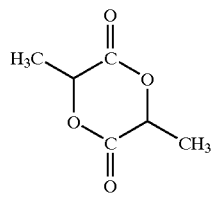
<Formula 3>

The alkylene oxides usable in the present invention are compounds of Formula 4, which are selected from the group consisting of ethylene oxide, propylene oxide, 1-butene oxide, 2-butene oxide, 1,1-dimethylethylene oxide, cyclopentene oxide, cyclohexene oxide, 1-phenylethylene oxide, 1-vinylethylene oxide, and 1-trifluoromethylethylene oxide.

<Formula 4>

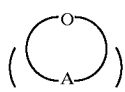

In the method of the present invention, the terpolymerization process of carbon dioxide, the alkylene oxide (—O—A-ring), and lactide is shown in Reaction Formula 1.

<Reaction Formula 1>

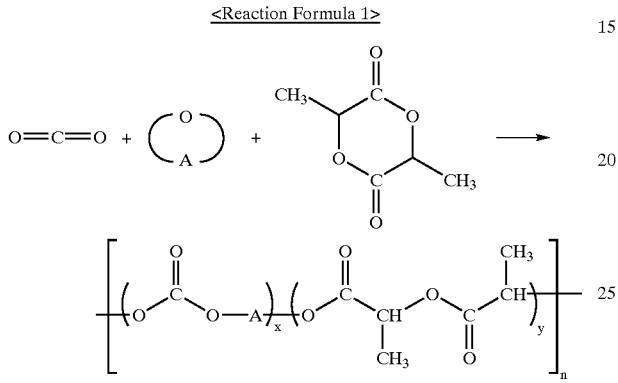

Hereinafter, lactide or delta-valerolactone is defined as "monomer 1".

In the detailed method of the present invention, alkylene oxide and monomer 1 are first mixed in a molar ratio of 99.99:0.01 to 0.01:99.99, and a catalyst is then added to the mixture. This process is suitably carried out under a nitrogen atmosphere and generally in a pressurized reactor, in order to facilitate polymerization.

The catalyst is added in an amount of 0.1 to 20.0 wt % based on the total amount of monomer 1 and alkylene oxide; and the catalyst is zinc glutaric acid, preferably vacuum-dried zinc glutaric acid, which has excellent catalytic activity.

The zinc glutaric acid catalyst used in the present invention is prepared as follows. Zinc oxide or zinc hydroxide, and glutaric acid, are used in the same equivalent and toluene is used as a solvent. The mixture is vigorously stirred, it is reacted at 55° C. for 2 hours, and then for 4 hours under reflux, to prepare zinc glutaric acid. After the reaction, the solid zinc glutaric acid product is filtered while washing with acetone, and then dried in a vacuum-drying oven at 50 to 150° C. for one day.

Carbon dioxide is then injected into the mixture at a pressure of 50 to 1000 psi, and terpolymerization is carried out for 20 to 80 hours at 0 to 100° C. When the carbon dioxide injection pressure is lower than 50 psi, the concentration of carbon dioxide in a reactor is low so that it results in a low reaction yield during the polymer synthesis. Alternatively, when the carbon dioxide injection pressure is higher than 1000 psi, there is a danger of accidents caused by high pressure and there is a need to have a high-pressure reactor that is specially prepared for tolerating high pressures. When the reaction temperature is lower than 0° C., it takes a long time to carry out the reaction, and when the temperature is higher than 100° C., by-products other than polymers are produced. When a pressurized reactor is used, carbon dioxide is injected after the pressurized reactor is covered with a lid in order to facilitate polymerization. Since the melting point of lactide is 116 to 119° C., lactide is solid below 100° C., and therefore, when lactide is used as a monomer 1 and an amount of solid lactide is more than a 50 molar ratio, organic solvents such as 1,4-dioxane, toluene, benzene, methylene chloride, or cyclohexane are preferably used. Regarding delta-valerolactone, since it is liquid below 100° C., there is no problem mixing the reactants irrespective of their amount. Therefore, there is no need to use the above organic solvent, but it can be used if needed.

By the above process, a poly(alkylene carbonate-lactide) copolymer of Formula 1 or a poly(alkylene carbonate-delta-valerolactone) copolymer of Formula 2 is produced.

<Formula 1>
<Formula 2>

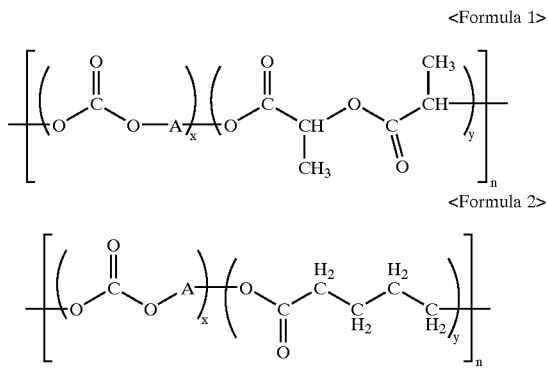

(wherein, —O—A— is an opened alkylene oxide structure, the alkylene oxide being selected from the group consisting of ethylene oxide, propylene oxide, 1-butene oxide, 2-butene oxide, 1,1-dimethylethylene oxide, cyclopentene oxide, cyclohexene oxide, 1-phenylethylene oxide, 1-vinylethylene oxide, and 1-trifluoromethylethylene oxide; and, x and y are independently an integer being equal to or less than 2,000, n is an integer, and n=(z-x-y), wherein z is an integer being equal to or less than 20,000.)

After the completion of the reaction, the copolymer produced is diluted with organic solvent such as carbon dichloride and washed with diluted hydrochloric acid. Then, the washed copolymer is washed again with distilled water and precipitated with methanol to separate the copolymer. The obtained copolymer is dried at ambient temperature in a vacuum-drying oven. Additionally, if needed, a removing process of the remaining catalyst in the produced copolymer can be further carried out.

When lactide is used as a monomer 1, the produced poly(alkylene carbonate-lactide) copolymer has a molecular weight of 1,000 to 2,000,000, and it is preferably poly(propylene carbonate-lactide) of which the molecular weight is 1,000 to 2,000,000, poly(ethylene carbonate-lactide) of which the molecular weight is 1,000 to 2,000,000, or poly(cyclohexene carbonate-lactide) of which molecular weight is 1,000 to 2,000,000. In addition, when delta-valerolactone is used as a monomer 1, the produced poly(alkylene carbonate-delta-valerolactone) copolymer has a weight average molecular weight of 1,000 to 2,000,000, and it is preferably poly(propylene carbonate-delta-valerolactone) of which the weight average molecular weight is 1,000 to 2,000,000, poly(ethylene carbonate-delta-valerolactone) of which the weight average molecular weight is 1,000 to 2,000,000, or poly(cyclohexene carbonate-delta-valerolactone) of which the weight average molecular weight is 1,000 to 2,000,000.

The method of the present invention uses carbon dioxide as a main ingredient, which is a main cause of air pollution and the greenhouse effect, and alkylene oxide which is relatively cheap, and lactide or delta-valerolactone which have biodegradable properties and prepare a poly(alkylene carbonate-lactide) copolymer or a poly(alkylene carbonate-delta-valerolactone) copolymer. Thus, the present invention produces new polymer materials using carbon dioxide fixation so that it contributes to suppression of air pollution and the climate change phenomenon by carbon dioxide because it reduces an amount of carbon dioxide through recycling thereof. Since a poly(alkylene carbonate-lactide) copolymer and a poly(alkylene carbonate-delta-valerolactone) copolymer prepared by the method of the present invention have excellent hydrolysis and biodegradable properties, they can be used as general polymer materials that do not cause environmental pollution as well as for medical polymer materials.

Hereinafter, preferred examples are provided to assist the understanding of the present invention. These following examples, however, are only for the purpose of facilitating understanding of the invention and should not be construed to be limiting in any sense.

EXAMPLE 1

1 g of zinc glutaric acid catalyst synthesized from zinc oxide and glutaric acid was dried at 100° C. under vacuum for one day.

In a glove box under a nitrogen atmosphere, 1 g of the dried zinc glutaric acid catalyst was placed in a pressurized reactor and 94.4 ml (1.349 mol) of propylene oxide and 21.6 g (0.150 mol) of lactide were added. After covering the pressurized reactor with a lid, carbon dioxide was injected therein to reach 400 psi of pressure, and it was reacted for 40 hours while maintaining 60° C.

After completing the reaction, the carbon dioxide was removed and carbon dichloride was added to the reaction mixture to dilute it. In order to remove the catalyst, the diluted reaction mixture was washed with diluted hydrochloric acid and washed again with distilled water. After removing the catalyst, the carbon dichloride was evaporated from the obtained reaction mixture and the product was obtained after precipitating with methanol. The reaction yield was determined by measuring the weight of the product and the chemical composition of the copolymer was analyzed by NMR spectroscopy.

As a result of the reaction, 51.0 g of product were obtained, and the chemical composition of the synthesized poly(propylene carbonate-lactide) was 75% propylene carbonate and 25% lactide.

EXAMPLE 2

1 g of zinc glutaric acid catalyst synthesized from zinc oxide and glutaric acid was dried at 100° C. under vacuum for one day.

In a glove box under a nitrogen atmosphere, 1 g of the dried zinc glutaric acid catalyst was placed in a pressurized reactor and 74.4 ml (1.063 mol) of propylene oxide and 38.3 g (0.266 mol) of lactide were added. After covering the pressurized reactor with a lid, carbon dioxide was injected therein to reach 400 psi of pressure, and it was reacted for 40 hours while maintaining 60° C.

After completing the reaction, the carbon dioxide was removed and carbon dichloride was added to the reaction mixture to dilute it. In order to remove the catalyst, the diluted reaction mixture was washed with diluted hydrochloric acid and washed again with distilled water. After removing the catalyst, the carbon dichloride was evaporated from the obtained reaction mixture and the product was obtained after precipitating with methanol. After removing the solvent in a vacuum oven, the reaction yield was determined by measuring the weight of the product, and the chemical composition of the copolymer was analyzed by NMR spectroscopy.

As a result of the reaction, 57.0 g of product was obtained, and the chemical composition of the synthesized poly(propylene carbonate-lactide) was 75% propylene carbonate and 25% lactide.

EXAMPLE 3

1 g of zinc glutaric acid catalyst synthesized from zinc oxide and glutaric acid was dried at 100° C. under vacuum for one day.

In a glove box under a nitrogen atmosphere, 1 g of the dried zinc glutaric acid catalyst was placed in a pressurized reactor and 58.4 ml (0.835 mol) of propylene oxide and 51.5 g (0.357 mol) of lactide were added. After covering the pressurized reactor with a lid, carbon dioxide was injected therein to reach 400 psi of pressure, and it was reacted for 40 hours while maintaining 60° C.

After completing the reaction, the carbon dioxide was removed and carbon dichloride was added to the reaction mixture to dilute it. In order to remove the catalyst, the diluted reaction mixture was washed with diluted hydrochloric acid and washed again with distilled water. After removing the catalyst, the carbon dichloride was evaporated from the obtained reaction mixture and the product was obtained after precipitating with methanol. After removing the solvent in a vacuum oven, the reaction yield was determined by measuring the weight of the product, and the chemical composition of the copolymer was analyzed by NMR spectroscopy.

As a result of the reaction, 68.7 g of product was obtained, and the chemical composition of the synthesized poly(propylene carbonate-lactide) was 54% propylene carbonate and 46% lactide.

EXAMPLE 4

1 g of zinc glutaric acid catalyst synthesized from zinc oxide and glutaric acid was dried at 100° C. under vacuum for one day.

In a glove box under a nitrogen atmosphere, 1 g of the dried zinc glutaric acid catalyst was placed in a pressurized reactor, and 45.5 ml (0.694 mol) of propylene oxide and 62.3 g (0.432 mol) of lactide were added. After covering the pressurized reactor with a lid, carbon dioxide was injected therein to reach 400 psi of pressure, and it was reacted for 40 hours while maintaining 60° C.

After completing the reaction, the carbon dioxide was removed and carbon dichloride was added to the reaction mixture to dilute it. In order to remove the catalyst, the diluted reaction mixture was washed with diluted hydrochloric acid and washed again with distilled water. After removing the catalyst, the carbon dichloride was evaporated from the obtained reaction mixture, the reaction yield was determined by measuring the weight of the product, and the chemical composition of the copolymer was analyzed by NMR spectroscopy.

As a result of the reaction, 88.2 g of product was obtained and the chemical composition of the synthesized poly(propylene carbonate-lactide) was 46% propylene carbonate and 54% lactide.

EXAMPLE 5

1 g of zinc glutaric acid catalyst synthesized from zinc oxide and glutaric acid was dried at 100° C. under vacuum for one day.

In a glove box under a nitrogen atmosphere, 1 g of the dried zinc glutaric acid catalyst was placed in a pressurized reactor and 32.5 ml (0.464 mol) of propylene oxide, 73.0 g (0.506 mol) of lactide, and 100 ml of purified dioxane as a solvent were added. After covering the pressurized reactor with a lid, carbon dioxide was injected therein to reach 400 psi of pressure, and it was reacted for 40 hours while maintaining 60° C.

After completing the reaction, the carbon dioxide was removed and carbon dichloride was added to the reaction mixture to dilute it. In order to remove the catalyst, the diluted reaction mixture was washed with diluted hydrochloric acid and washed again with distilled water. After removing the catalyst, the carbon dichloride and the dioxane were evaporated from the obtained reaction mixture, the reaction yield was determined by measuring the weight of the product, and the chemical composition of the copolymer was analyzed by NMR spectroscopy.

As a result of the reaction, 27.8 g of product was obtained, and the chemical composition of the synthesized poly(propylene carbonate-lactide) was 75% propylene carbonate and 25% lactide.

COMPARATIVE EXAMPLE 1

1 g of zinc glutaric acid catalyst synthesized from zinc oxide and glutaric acid was dried at 100° C. under vacuum for one day.

In a glove box under a nitrogen atmosphere, 1 g of the dried zinc glutaric acid catalyst was placed in a pressurized reactor and 100 ml (1.43 mol) of propylene oxide was added. After covering the pressurized reactor with a lid, carbon dioxide was injected therein to reach 400 psi of pressure, and it was reacted for 40 hours while maintaining 60° C.

After completing the reaction, the carbon dioxide was removed and carbon dichloride was added to the reaction mixture to dilute it. In order to remove the remaining catalyst, the diluted reaction mixture was washed with diluted hydrochloric acid and washed again with distilled water. After removing the catalyst, the carbon dichloride was evaporated from the obtained reaction mixture and the product was obtained after precipitating with methanol.

After removing the solvent in a vacuum oven, the reaction yield was determined by measuring the weight of the product, and the chemical composition of the copolymer was analyzed by NMR spectroscopy.

As a result of the reaction, 50.3 g of product was obtained, and the polymer product was confirmed to be poly(propylene carbonate).

COMPARATIVE EXAMPLE 2

1 g of zinc glutaric acid catalyst synthesized from zinc oxide and glutaric acid was dried at 100° C. under vacuum for one day.

In a glove box under a nitrogen atmosphere, 1 g of the dried zinc glutaric acid catalyst was placed in a pressurized reactor and 100 ml (0.649 mol) of dioxane solvent and 100 g (0.693 mol) of lactide were added. After covering the pressurized reactor with a lid, carbon dioxide was injected therein to reach 400 psi of pressure, and it was reacted for 40 hours while maintaining 60° C.

When the reaction was terminated, the polymer product should have been obtained after precipitating with methanol, but it was not obtained. That is, it was confirmed that the carbon dioxide and the lactide were not polymerized.

The product yields and results of Examples 1 to 5 and Comparative Examples 1 and 2 are shown in Table 1.

TABLE 1

| | Used propylene oxide/lactide (molar raio) | Yield (copolymer g/ catalyst g) | Composition of synthesized copolymer (molar ratio) (propylene carbonate:lactide) |
|---|---|---|---|
| Example 1 | 90/10 | 51.0 | 75:25 |
| Example 2 | 80/20 | 57.0 | 75:25 |
| Example 3 | 70/30 | 68.7 | 54:46 |
| Example 4 | 60/40 | 88.2 | 46:54 |
| Example 5 | 50/50 | 27.8 | 75:25 |
| Comparative Example 1 | 100/0 | 50.3 | 100:0 |
| Comparative Example 2 | 0/100 | No reaction | — |

As shown in Table 1, the methods of Examples 1 to 5 prepared poly(propylene carbonate-lactide), but Comparative Example 1 prepared poly(propylene carbonate) and Comparative Example 2 did not prepare a copolymer.

In order to measure relative molecular weights of poly(propylene carbonate-lactide) prepared by the methods of Examples 1 to 5, intrinsic viscosities were measured with a viscometer, and the results are shown in Table 2.

TABLE 2

| | Composition of synthesized copolymer (molar ratio) (propylene carbonate:lactide) | Intrinsic viscosity*1 |
|---|---|---|
| Example 1 | 75:25 | 2.07 |
| Example 2 | 75:25 | 1.76 |
| Example 3 | 54:46 | 1.03 |
| Example 4 | 46:54 | 1.26 |
| Example 5 | 75:25 | 1.22 |
| | polylactide*2 | 1.04 |

*1solvent: tetrahydrofuran, temperature 25° C.
*2polylactide: weight average molecular weight (Mw) = 256k, number average molecular weight (Mn) = 110k From the intrinsic viscosities of Table 2, it can be confirmed that copolymers prepared by the methods of Examples 1 to 5 have weight average molecular weights of about 250,000 to 550,000, and number average molecular weights of about 109,000 to 220,000.

In addition, thermal stabilities of poly(propylene carbonate-lactide) synthesized in Examples 1 to 5 were measured by thermal gravimetric analysis (TGA) and differential scanning calorimetry (DSC). The temperature that indicated a 1% weight loss of synthesized polymer was measured by TGA, and the glass transition temperature was measured at a heating speed of 10° C./minute by DSC. The results are shown in Table 3.

TABLE 3

| | Composition of synthesized copolymer(molar ratio) (propylene carbonate:lactide) | Glass transition temperature (° C.) | Thermal decomposition temperature[*1] (° C.) |
|---|---|---|---|
| Example 1 | 75:25 | 32.4 | 120 |
| Example 2 | 75:25 | 28.2 | 141 |
| Example 3 | 54:46 | 36.6 | 248 |
| Example 4 | 46:54 | 40.2 | 242 |
| Example 5 | 75:25 | 38.5 | 245 |

[*1]thermal decomposition temperature: the temperature at which a 1% weight loss of polymer occurs As shown in Table 1, since polymers of Examples 1 to 5 have glass transition temperatures of 28 to 41° C. and biodegradable properties, they can be widely used for such things as medical materials, adhesives and so on. Since their thermal decomposition temperatures are at most 242° C., they can also be used as binders for preparing ceramics and since they have relatively low thermal decomposition temperatures, it can be known that they are eco-friendly materials.

In order to confirm biodegradability of the poly(propylene carbonate-lactide) copolymer of Example 4, degradation by an enzyme was tested. The copolymer synthesized in Example 4 was made into a film (1×1 cm) and weight loss of the copolymer was tested with Novel esterase (Sigma, ESL001) in a 0.2M buffer solution (pH=7) at 37° C. The results are shown in Table 4.

TABLE 4

| | 10 days | 24 days |
|---|---|---|
| Weight before test (mg) | 5.0 | 10.5 |
| Weight after test (mg)[*1] | 1.2 | 0.5 |
| Weight loss (mg) | 3.8 | 10.0 |
| Weight loss (%) | 76.0 | 95.2 |

[*1]enzyme concentration: Novel esterase 0.25 mg/ml (buffer solution)

As shown in Table 4, the poly(propylene carbonate-lactide) copolymer prepared in Example 4 was mostly degraded after 24 days. Therefore, using the copolymer prepared in Example 4 can reduce pollution by waste polymers.

As mentioned above, the present invention prepares a biodegradable poly(alkylene carbonate-lactide) copolymer using carbon dioxide, which is a main cause of air pollution. Since a poly(alkylene carbonate-lactide) has excellent biodegradable properties, it can be used for general polymer materials as well as for medical materials.

EXAMPLE 6

1 g of zinc glutaric acid catalyst synthesized from zinc oxide and glutaric acid was dried at 100° C. under vacuum for one day.

In a glove box under a nitrogen atmosphere, 1 g of the dried zinc glutaric acid catalyst was placed in a pressurized reactor, and 63.8 ml (0.912 mol) of propylene oxide and 36.2 ml (0.365 mol) of delta-valerolactone were added. After covering the pressurized reactor with a lid, carbon dioxide was injected therein to reach 400 psi of pressure, and it was reacted for 40 hours while maintaining 60° C.

After completing the reaction, the carbon dioxide was removed and carbon dichloride was added to the reaction mixture to dilute it. In order to remove the catalyst, the diluted reaction mixture was washed with diluted hydrochloric acid and washed again with distilled water. After removing the catalyst, the carbon dichloride was evaporated from the obtained reaction mixture and the product was obtained after precipitating with methanol. The reaction yield was determined by measuring the weight of the product, and the amounts of polypropylene carbonate and poly delta-valerolactone of the copolymer product were analyzed by NMR spectroscopy.

As a result of the reaction, 75.2 g of product was obtained, and the chemical composition of the synthesized poly (propylene carbonate-delta-valerolactone) was 66.8% propylene carbonate and 33.2% valerolactone.

EXAMPLE 7

1 g of zinc glutaric acid catalyst synthesized from zinc oxide and glutaric acid was dried at 100° C. under vacuum for one day.

In a glove box under a nitrogen atmosphere, 1 g of the dried zinc glutaric acid catalyst was placed in a pressurized reactor, and 53.1 ml (0.759 mol) of propylene oxide and 46.9 ml (0.520 mol) of delta-valerolactone were added. After covering the pressurized reactor with a lid, carbon dioxide was injected therein to reach 400 psi of pressure, and it was reacted for 40 hours while maintaining 60° C.

After completing the reaction, the carbon dioxide was removed and carbon dichloride was added to the reaction mixture to dilute it. In order to remove the catalyst, the diluted reaction mixture was washed with diluted hydrochloric acid and washed again with distilled water. After removing the catalyst, the carbon dichloride was evaporated from the obtained reaction mixture and the product was obtained after precipitating with methanol. The reaction yield was determined by measuring the weight of the product, and the amounts of polypropylene carbonate and poly delta-valerolactone of the copolymer product were analyzed by NMR spectroscopy.

As a result of the reaction, 67.1 g of product was obtained, and the chemical composition of the synthesized poly (propylene carbonate-delta-valerolactone) was 29.6% propylene carbonate and 70.4% valerolactone.

EXAMPLE 8

1 g of zinc glutaric acid catalyst synthesized from zinc oxide and glutaric acid was dried at 100° C. under vacuum for one day.

In a glove box under a nitrogen atmosphere, 1 g of the dried zinc glutaric acid catalyst was placed in a pressurized reactor and 43.0 ml (0.614 mol) of propylene oxide and 57.0 ml (0.632 mol) of delta-valerolactone were added. After covering the pressurized reactor with a lid, carbon dioxide was injected therein to reach 400 psi of pressure, and it was reacted for 40 hours while maintaining 60° C.

After completing the reaction, the carbon dioxide was removed and carbon dichloride was added to the reaction mixture to dilute it. In order to remove the catalyst, the diluted reaction mixture was washed with diluted hydrochloric acid and washed again with distilled water. After removing the catalyst, the carbon dichloride was evaporated from the obtained reaction mixture and the product was obtained after precipitating with methanol. The reaction yield was determined by measuring the weight of the product, and the amounts of polypropylene carbonate and poly delta-valerolactone of the copolymer product were analyzed by NMR spectroscopy.

As a result of the reaction, 39.9 g of product was obtained, and the chemical composition of the synthesized poly (propylene carbonate-delta-valerolactone) was 55.4% propylene carbonate and 44.6% valerolactone.

EXAMPLE 9

1 g of zinc glutaric acid catalyst synthesized from zinc oxide and glutaric acid was dried at 100° C. under vacuum for one day.

In a glove box under a nitrogen atmosphere, 1 g of the dried zinc glutaric acid catalyst was placed in a pressurized reactor and 33.5 ml (0.479 mol) of propylene oxide and 66.5 ml (0.737 mol) of delta-valerolactone were added. After covering the pressurized reactor with a lid, carbon dioxide was injected therein to reach 400 psi of pressure and it was reacted for 40 hours while maintaining 60° C.

After completing the reaction, the carbon dioxide was removed, and carbon dichloride was added to the reaction mixture to dilute it. In order to remove the catalyst, the diluted reaction mixture was washed with diluted hydrochloric acid and washed again with distilled water. After removing the catalyst, the carbon dichloride was evaporated from the obtained reaction mixture, and the product was obtained after precipitating with methanol. The reaction yield was determined by measuring the weight of the product, and the amounts of polypropylene carbonate and poly delta-valerolactone of the copolymer product were analyzed by NMR spectroscopy.

As a result of the reaction, 32.5 g of product were obtained, and the chemical composition of the synthesized poly(propylene carbonate-delta-valerolactone) was 20.3% propylene carbonate and 79.7% valerolactone.

EXAMPLE 10

1 g of zinc glutaric acid catalyst synthesized from zinc oxide and glutaric acid was dried at 100° C. under vacuum for one day.

In a glove box under a nitrogen atmosphere, 1 g of the dried zinc glutaric acid catalyst was placed in a pressurized reactor and 24.4 ml (0.349 mol) of propylene oxide and 75.6 ml (0.838 mol) of delta-valerolactone were added. After covering the pressurized reactor with a lid, carbon dioxide was injected therein to reach 400 psi of pressure, and it was reacted for 40 hours while maintaining 60° C.

After completing the reaction, the carbon dioxide was removed, and carbon dichloride was added to the reaction mixture to dilute it. In order to remove the catalyst, the diluted reaction mixture was washed with diluted hydrochloric acid and washed again with distilled water. After removing the catalyst, the carbon dichloride was evaporated from the obtained reaction mixture, and the product was obtained after precipitating with methanol. The reaction yield was determined by measuring the weight of the product, and the amount of polypropylene carbonate and poly delta-valerolactone of the copolymer product were analyzed by NMR spectroscopy.

As a result of the reaction, 21.8 g of product was obtained, and the chemical composition of the synthesized poly (propylene carbonate-delta-valerolactone) was 28.3% propylene carbonate and 71.7% valerolactone.

COMPARATIVE EXAMPLE 3

1 g of zinc glutaric acid catalyst synthesized from zinc oxide and glutaric acid was dried at 100° C. under vacuum for one day.

In a glove box under a nitrogen atmosphere, 1 g of the dried zinc glutaric acid catalyst was placed in a pressurized reactor and 100 ml (1.43 mol) of propylene oxide was added. After covering the pressurized reactor with a lid, carbon dioxide was injected therein to reach 400 psi of pressure, and it was reacted for 40 hours while maintaining 60° C.

After completing the reaction, the carbon dioxide was removed and carbon dichloride was added to the reaction mixture to dilute it. In order to remove the remaining catalyst, the diluted reaction mixture was washed with diluted hydrochloric acid and washed again with distilled water. After removing the catalyst, the carbon dichloride was evaporated from the obtained reaction mixture and the product was obtained after precipitating with methanol. The reaction yield was determined by measuring the weight of the product, and the chemical structure of the polypropylene carbonate of the copolymer product was analyzed by NMR spectroscopy.

As a result of the reaction, 50.3 g of product was obtained, and the polymer product was confirmed to be poly (propylene carbonate).

COMPARATIVE EXAMPLE 4

1 g of zinc glutaric acid catalyst synthesized from zinc oxide and glutaric acid was dried at 100° C. under vacuum for one day.

In a glove box under a nitrogen atmosphere, 1 g of the dried zinc glutaric acid catalyst was placed in a pressurized reactor, and 100 ml of dioxane solvent and 100 g of delta-valerolactone were added. After covering the pressurized reactor with a lid, carbon dioxide was injected therein to reach 400 psi of pressure, and it was reacted for 40 hours while maintaining 60° C.

When the reaction was terminated, the polymer product should be have been obtained after precipitating with methanol, but it was not. That is, it was confirmed that the carbon dioxide and the delta-valerolactone were not polymerized.

The product yields and results of Examples 6 to 10 and Comparative Examples 3 and 4 are shown in Table 5.

TABLE 5

| | Used propylene oxide/ Delta-valerolactone (molar ratio) | Yield (copolymer g/catalyst g) | Composition of synthesized copolymer (propylene carbonate/delta-valerolactone) |
|---|---|---|---|
| Example 6 | 7/3 | 75.2 | 66.8/33.2 |
| Example 7 | 6/4 | 67.1 | 29.6/70.4 |
| Example 8 | 5/5 | 39.9 | 55.4/44.6 |
| Example 9 | 4/6 | 32.5 | 20.3/79.7 |
| Example 10 | 3/7 | 21.8 | 28.3/71.7 |
| Comparative Example 3 | 10/0 | 50.3 | 100/0 |
| Comparative Example 4 | 0/100 | No reaction | — |

As shown in Table 5, the methods of Examples 6 to 10 prepared poly(propylene carbonate-delta-valerolactone), but Comparative Example 3 prepared poly(propylene carbonate) not a copolymer, and Comparative Example 4 did not prepare a copolymer.

Molecular weights and molecular weight distributions of poly(propylene carbonate-delta-valerolactone) copolymer prepared by the methods of Examples 6 to 10 and Com parative Example 3 were measured by Gel Permeation Chromatography and the results are shown in Table 6.

TABLE 6

| | Composition of synthesized copolymer (propylene carbonate/delta-valerolactone) | Molecular weight*1 Number average molecular weight/weight average molecular weight/molecular weight distribution (Mn/Mw/PDI*2) |
|---|---|---|
| Example 6 | 66.8/33.2 | 71.8k/278k/3.89 |
| Example 7 | 29.6/70.4 | 71.7k/156k/2.18 |
| Example 8 | 55.4/44.6 | 20.2k/103k/5.08 |
| Example 9 | 20.3/79.7 | 18.8k/69.4k/5.08 |
| Example 10 | 28.3/71.7 | 14.6k/73.01/5.00 |
| Comparative Example 3 | 100/0 | 143k/343k/2/40 |

*1solvent: tetrahydrofurane, flow rate: 1 ml/min
*2molecular weight distribution (PDI): weight average molecular weight (Mw)/number average molecular weight (Mn)

As shown in Table 6, the number average molecular weights of the poly(propylene carbonate-delta-valerolactone) copolymers prepared by the methods of Examples 6 to 10 and Comparative Example 3 are about 14,000 to 72,000, and the weight average molecular weights are about 7,000 to 280,000.

Thermal stabilities of poly(propylene carbonate-delta-valerolactone) synthesized in Examples 6 to 10 and Comparative Example 3 were measured by thermal gravimetric analysis (TGA) and differential scanning calorimetry (DSC). Temperatures at which a 1% weight loss of the synthesized polymers occurred were measured by TGA, and glass transition temperatures were measured at a heating speed of 10° C./minute by DSC. The results are shown in Table 7.

TABLE 7

| | Composition of synthesized copolymer (propylene carbonate/valerolactone) | Glass transition temperature (° C.) | Melting point (° C.) | Thermal decomposition temperature*1 (° C.) |
|---|---|---|---|---|
| Example 6 | 66.8/33.2 | 32.4 | 55.9 | 241 |
| Example 7 | 29.6/70.4 | 28.2 | 57.2 | 266 |
| Example 8 | 55.4/44.6 | 36.6 | 54.2 | 245 |
| Example 9 | 20.3/79.7 | 40.2 | 55.9 | 266 |
| Example 10 | 28.3/71.7 | 21.0 | 54.9 | 257 |
| Comparative Example 3 | 100/0 | 38.0 | — | 252 |

*1Thermal decomposition temperature: the temperature which indicates a 1% weight loss of the polymer As shown in Table 7, since polymers of Examples 6 to 10 have glass transition temperature of 21 to 41° C., and biodegradable properties, they can be widely used for such things as medical materials, adhesives, and so on. Since their thermal decomposition temperatures are at the most 242° C., they can also be used as binders for preparing ceramics and since they have relatively low thermal decomposition temperatures, it can be known that they are eco-friendly materials.

In order to confirm biodegradability of the poly(propylene carbonate-delta-valerolactone) copolymer of Example 6, degradation by an enzyme was tested. The copolymer synthesized in Example 6 was made into a film (1×1 cm), and weight loss of the copolymer was tested with Pseudomonas (PS) lipase in a 0.2M buffer solution (pH=7) at 37° C. The results are shown in Table 8.

TABLE 8

| | 6 h | 12 h | 24 h | 48 h | 96 h |
|---|---|---|---|---|---|
| Weight before test (mg) | 18.4 | 13.5 | 17.7 | 19.3 | 13.8 |
| Weight after test (mg)*1 | 18.0 | 13.1 | 16.5 | 16.5 | 6.2 |
| Weight loss (mg) | 0.4 | 0.4 | 1.2 | 2.8 | 7.6 |
| Weight loss (%) | 2.2 | 2.2 | 6.8 | 14.5 | 55.1 |

*1enzyme concentration: PS-lipase 0.5 mg/ml (buffer solution)

As shown in Table 8, the poly(propylene carbonate-delta-valerolactone) copolymer prepared in Example 6 has excellent biodegradability by an enzyme, and the biodegradability increases as time passes.

As mentioned above, the present invention prepares biodegradable poly(alkylene carbonate-delta-valerolactone) copolymers using carbon dioxide which is a main cause of air pollution. Since a poly(alkylene carbonate-delta-valerolactone) has excellent hydrolysis and biodegradable properties, it can be used for general polymer materials as well as for medical materials.

What is claimed is:

1. A method of preparing a copolymer including an alkylene carbonate, comprising terpolymerization of delta-valerolactone or lactide represented by Formula 3, carbon dioxide, and alkylene oxide in the presence of a catalyst,

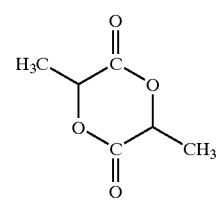

<Formula 3>

2. The method of claim 1, wherein the copolymer including the alkylene carbonate is a poly(alkylene carbonate-lactide) copolymer represented by Formula 1, <Formula 1>

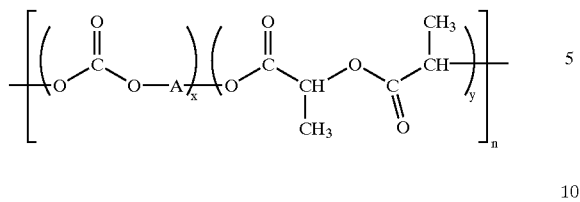

(wherein, —O—A— is an opened alkylene oxide structure, the alkylene oxide being selected from the group consisting of ethylene oxide, propylene oxide, 1-butene oxide, 1,1-dimethylethylene oxide, cyclopentene oxide, cyclohexene oxide, 1-phenylethylene oxide, 1-vinylethylene oxide, and 1-trifluoromethylethylene oxide; and x and y are independently an integer being equal to or less than 2,000, n is an integer, n=(z-x-y), wherein z is an integer being equal to or less than 20,000.)

3. The method of claim 1, wherein the copolymer including the alkylene carbonate is a poly(alkylene carbonate-delta-valerolactone) copolymer represented by Formula 2, <Formula 2>

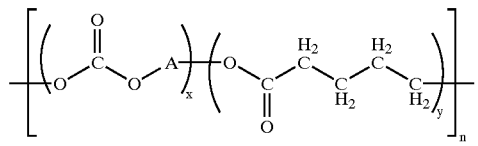

(wherein, —O—A— is an opened alkylene oxide structure, the alkylene oxide being selected from the group consisting of ethylene oxide, propylene oxide, 1-butene oxide, 1,1-dimethylethylene oxide, cyclopentene oxide, cyclohexene oxide, 1-phenylethylene oxide, 1-vinylethylene oxide, and 1-trifluoromethylethylene oxide; and x and y are independently an integer being equal to or less than 2,000, n is an integer, and n=(z-x-y), wherein z is an integer being equal to or less than 20,000.)

4. The method of claim 1, wherein the catalyst is zinc glutaric acid.

5. The method of claim 1, wherein the terpolymerization process further comprises an organic solvent.

6. The method of claim 5, wherein the organic solvent is selected from the group consisting of 1,4-dioxane, toluene, benzene, methylene chloride, and cyclohexane.

7. A copolymer including an alkylene carbonate, represented by Formula 1 or 2,

<Formula 1>

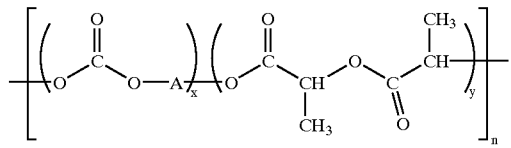

<Formula 2>

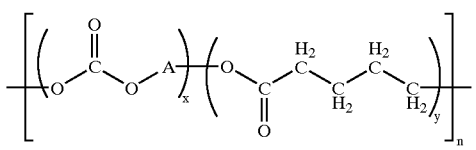

(wherein, —O—A— is an opened alkylene oxide structure, the alkylene oxide being selected from the group consisting of ethylene oxide, propylene oxide, 1-butene oxide, 1,1-dimethylethylene oxide, cyclopentene oxide, cyclohexene oxide, 1-phenylethylene oxide, 1-vinylethylene oxide, and 1-trifluoromethylethylene oxide; and x and y are independently an integer being equal to or less than 2,000, n is an integer, and n=(z-x-y), wherein z is an integer being equal to or less than 20,000.)

8. The copolymer of claim 7, wherein the included alkylene carbonate is an aliphatic poly(alkylene carbonate-lactide) copolymer having a molecular weight of 1,000 to 2,000,000.

9. The copolymer of claim 8, wherein the poly(alkylene carbonate-lactide) is a poly(propylene carbonate-lactide) copolymer having a molecular weight of 1,000 to 2,000,000.

10. The copolymer of claim 8, wherein the poly(alkylene carbonate-lactide) is a poly(ethylene carbonate-lactide) copolymer having a molecular weight of 1,000 to 2,000,000.

11. The copolymer of claim 8, wherein the poly(alkylene carbonate-lactide) is a poly(cyclohexene carbonate-lactide) copolymer having a molecular weight of 1,000 to 2,000,000.

12. The copolymer of claim 7, wherein the copolymer including the alkylene carbonate is a poly(alkylene carbonate-delta-valerolactone) copolymer having a molecular weight of 1,000 to 2,000,000.

13. The copolymer of claim 12, wherein the poly(alkylene carbonate-delta-valerolactone) is a poly(propylene carbonate-delta-valerolactone) copolymer having a molecular weight of 1,000 to 2,000,000.

14. The copolymer of claim 12, wherein the poly(alkylene carbonate-delta-valerolactone) is a poly(ethylene carbonate-delta-valerolactone) copolymer having a molecular weight of 1,000 to 2,000,000.

15. The copolymer of claim 12, wherein the poly(alkylene carbonate-delta-valerolactone) is a poly(cyclohexene carbonate-delta-valerolactone) copolymer having a molecular weight of 1,000 to 2,000,000.

* * * * *